United States Patent [19]

Zoor

[11] 4,289,260
[45] Sep. 15, 1981

[54] ROOF CARRIER FOR MOTOR VEHICLES

[75] Inventor: Reinhold Zoor, Dachau, Fed. Rep. of Germany

[73] Assignee: Heinrich Wunder KG, Dachau, Fed. Rep. of Germany

[21] Appl. No.: 68,020

[22] Filed: Aug. 20, 1979

[30] Foreign Application Priority Data

Aug. 18, 1978 [DE] Fed. Rep. of Germany ....... 2836311

[51] Int. Cl.³ .............................................. B60R 9/08
[52] U.S. Cl. .................................. 224/315; 224/321; 224/330; 224/331
[58] Field of Search ............... 224/42.13, 42.14, 42.24, 224/309, 314, 315, 317, 319, 321, 322, 324, 325, 329, 330, 331

[56] References Cited

U.S. PATENT DOCUMENTS

| | | | |
|---|---|---|---|
| 3,137,422 | 6/1964 | Wheaton | 224/321 X |
| 3,260,429 | 7/1966 | Yuda et al. | 224/324 |
| 3,325,069 | 6/1967 | Fulton | 224/315 |
| 3,349,977 | 10/1967 | Laminiti | 224/314 |
| 3,381,866 | 5/1968 | Wickett | 224/319 |
| 4,063,774 | 12/1977 | Hanks | 224/321 X |

FOREIGN PATENT DOCUMENTS 7604510 7/1976 Fed. Rep. of Germany .
7534542 12/1977 Fed. Rep. of Germany .

*Primary Examiner*—Stephen Marcus
*Attorney, Agent, or Firm*—Peter K. Kontler

[57] ABSTRACT

A roof carrier for use on motor vehicles for supporting surfing boards or the like on the roof includes a supporting structure consisting of a plurality of interconnected transversely and longitudinally extending elements, at least one holder assemblable with the supporting structure and a sliding member mounted on one of the elements for displacement between a withdrawn and an engaging position and so acting on the holder in its engaging position as to maintain the holder in engagement with the one element. The sliding member is provided with a lug which secures the sliding member in its engaging position. The one element and the sliding member are provided with a slot-shaped apertures with register with one another in the withdrawn position to let an enlarged end portion of the holder to pass therethrough and the common cross section of which in the engaging position is smaller than the transverse dimension of the enlarged end portion to prevent extraction of the latter.

14 Claims, 5 Drawing Figures

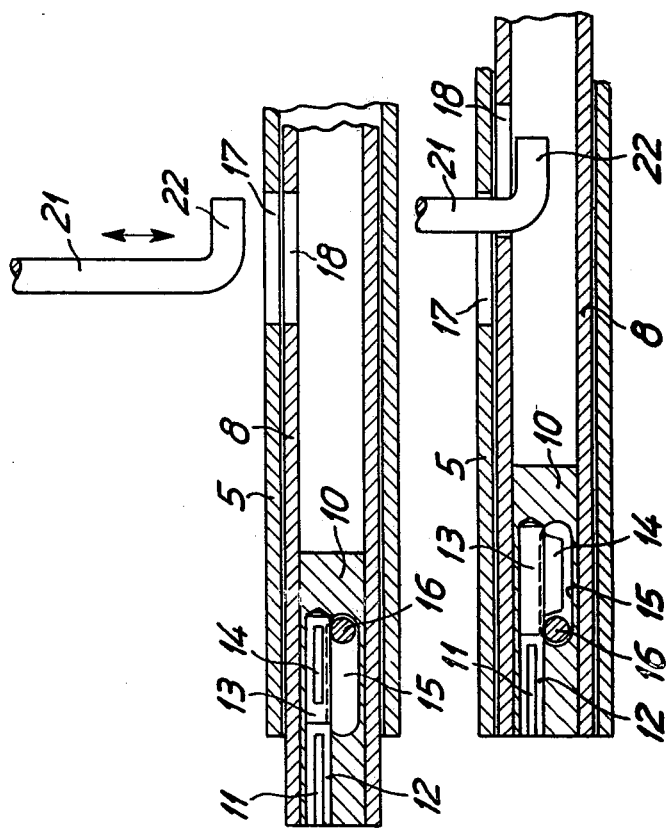
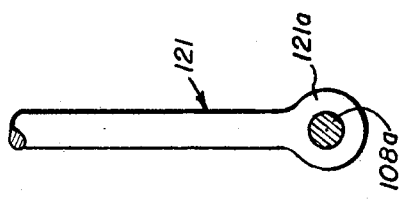

ROOF CARRIER FOR MOTOR VEHICLES

BACKGROUND OF THE INVENTION

The present invention relates to roof carriers in general, and more particularly to a roof carrier adapted for transporting surfing boards or the like on the roof of a passenger car. Still more particularly, the present invention is concerned with a roof carrier provided with an arrangement for preventing unauthorized removal from the roof carrier of the surfing boards or similar objects carried thereon.

Roof carriers of various constructions are already known and in widespread use. They may be constructed as roof racks constituting standard or optional equipment of a passenger car as supplied by a manufacturer, or they may be purchased separately and mounted on the roof of the car either permanently or detachably, depending on the construction of the roof carrier and the wishes of the user. Especially in the case of detachable mounting, the roof carriers may have specialized constructions conforming to the shape or other parameters of the objects to be supported thereby. In either event, the roof carrier includes a variety of interconnected elements extending longitudinally and transversely of the vehicle as considered in the assembled condition of the roof carrier on the motor vehicle and constituting a support structure which is connected to the motor vehicle.

In a conventional roof carrier which is known from U.S. Pat. No. 3,381,866, a holder is rigidly connected to a longitudinal element of the support structure which interconnects two transverse elements of the same structure. The holder is tubular and extends upwardly from the longitudinal element. This support structure serves for supporting a spare wheel which partially rests on the longitudinal element and partially on the rear transverse element. The holder extends through the central opening of the rim of the spare wheel. For connecting the spare wheel, a disc-shaped element is placed over the rim and an abutment is threaded onto an end portion of the holder which is provided with an external thread, until the abutment presses the plate against the rim. In order to avoid unauthorized removal of the spare tire, the abutment is secured against unthreading. There is provided an arresting element which has an eyelet and reaches into a hole of the rim. This arresting element can be connected to the abutment by means of a padlock passing through the eyelet so that the abutment is prevented from turning.

When the roof carrier-holder arrangement is constructed in this manner, it exhibits the drawback that the object to be transported, in this case the spare wheel, must be lifted to a relatively high level in order to render it possible to slip the same onto the holder. To be able to do this, the user of the car has to step on the running board, in order to be able to lift the spare wheel to this level in the first place. In addition, the spare wheel, which has a substantial weight, must be slipped onto the holder in exact alignment therewith not only at this substantial height, but also at a considerable lateral distance from the side of the car. This is very cumbersome in view of such substantial height and lateral distance. Furthermore, after the spare wheel has been properly positioned on the carrier and on the holder, the securing padlock has to be properly positioned and locked, still at this substantial height and lateral distance, which is also very difficult to do.

Exactly the same problems are encountered in a known roof carrier for surfing boards which is disclosed in the German Utility Model 76 04 510, inasmuch as a stationary holder is provided here, which passes through the central opening of the surfing board. As a result of this, it is necessary to slip the surfing board, which also has a very substantial weight, at the substantial elevation and at a considerable lateral distance from the side of the car, onto the holder. This operation can be performed by one person only with the exertion of a considerable effort. Because of the unfavorable possibilities of handling, there exists the danger that the surfing board could be damaged during its positioning, when the opening of the surfing board is not exactly aligned with the stationary holder at the time the surfing board is lowered onto the roof carrier. When this roof carrier is used, a padlock must again be connected to the protruding end of the holder, which is very difficult to achieve.

OBJECTS AND SUMMARY OF THE INVENTION

It is an object of the invention to provide a roof carrier capable of supporting objects, such as surfing boards, provided with a central hole, which does not exhibit the above-discussed drawbacks of the prior art arrangements of this type.

More particularly, it is an object of the invention to so construct the roof carrier as to simplify the mounting of the object thereon and the securing of such object thereto.

A concomitant object of the invention is to so design the roof carrier as to be simple in construction, easy to handle, and reliable.

One feature of the present invention resides in the provision of a roof carrier for use on motor vehicles which comprises a supporting structure mounted on the roof of a motor vehicle when in use and including a plurality of interconnected transversely and longitudinally extending elements, at least one holder assemblable with the supporting structure, and means for securing the holder to the supporting structure when assembled therewith, including a sliding member mounted on one of the elements for displacement between a withdrawn and an engaging position and so acting on the holder in the engaging position thereof as to hold the latter in engagement with the one element, and means for locking the sliding member at least in the engaging position.

An important advantage of such construction of the roof carrier is that the object to be transported need not be lifted upwardly of the holder and then lowered onto the latter. This is of particular importance under those circumstances where it is necessary to accurately position an object having a substantial weight, as it is, for instance, during the positioning of the spare wheel or the surfing board on the above-discussed roof carriers of the prior art. An advantage of the construction proposed by the present invention is that the relatively heavy object can be merely placed onto the roof carrier, if need be, aligned, and only then is the holder introduced into the opening of the object and engaged with the one element of the support structure. While the arrangement of the present invention is particularly advantageous for connecting an object which has a through opening therein, such as the abovementioned surfing board, a sailing craft or the like, to the roof carrier, the arrangement of the present invention may also be used for connecting other objects which do not have any through openings therein such as bicycles or the like. Under such circumstances, the holder can be constructed as a bracket which engages a wheel rim of the bicycle.

After the holder has been introduced into the opening or otherwise engaged with the object, and after the lower end of the holder has been engaged with the one element of the support structure, the sliding member is moved to its engaging position and thus secures the holder to the one element. In this connection, it is particularly advantageous when the one element is tubular and the sliding member is guided within the tubular element, inasmuch as the sliding member is located immediately below the object to be transported and thus several centimeters upwardly of the roof of the motor vehicle, so that it can be easily reached. The operation during the loading of the roof carrier according to the invention is thus particularly simple inasmuch as the rather heavy object need not be slid onto any stationary holder and, to secure the object, it is no longer necessary to perform operations above the object and at a relatively high level and at a location which can be reached only with difficulty.

To secure the holder, the one element which guides the sliding element can be provided with at least one opening into which an enlarged end portion of the holder can be introduced. The sliding member has several apertures whose number corresponds to the number of openings of the one element, the holder passing both through a selected opening and the aperture which is aligned therewith. When the object is to be secured, the sliding member is displaced from its withdrawn position in which an opening and the corresponding aperture are in registry with one another, into the engaging position in which the registering portions of the opening and aperture are small enough to tightly embrace the portion of the holder which passes therethrough, but smaller than the enlarged portion of the holder. In this manner, it is assured that the holder cannot be extracted from the common passage and thus disengaged from the one element. However, it is also possible to provide the holder with an eyelet into which a portion of the sliding member can be introduced in order to secure the holder to the one element.

In accordance with a currently preferred embodiment of the present invention, the one element, for instance, a longitudinally extending element, is constructed as a hollow element and the sliding member is guided in the interior of this hollow element. In this manner, there is obtained an especially good guidance by resorting to very simple measures, when the outer contour of the sliding member conforms to the inner contour of the hollow element, for instance, the above-mentioned longitudinal element of the support structure.

In order to ensure that the sliding member cannot interfere with the introduction of the separate holder which is introduced into the one element from above, or for the sliding member to remain in its withdrawn position, while the holder is being introduced, the sliding member can be urged towards its withdrawn position by elastic means, such as a spring or the like. When a longitudinally extending element of the support structure is used as a guide for the sliding member, it is advantageous when a lock for the sliding member is arranged at the front end of the longitudinally extending element, inasmuch as this place is readily accessible good regardless of the type or model of the car, because of the substantially identical arrangement of the windshield.

A particularly simple mode of operation is achieved when the lock is arranged in the sliding member, so that the sliding member can be moved by means of the key and can be locked in the engaging position by the same key. Hence, except for the axial and turning movement of the key, no additional steps are necessary during the securing of the holder against unauthorized removal.

When the roof carrier is constructed for transporting sailing crafts each of which has a through opening, the holder can have a rod-shaped configuration and can be provided with an abutment at its free end which is remote from the one element of the support structure to which the holder is connected in the assembled position. The abutment has a width which exceeds that of the opening of the sailing craft. In order to be able to conform the holder to the height of the sailing craft to be transported, such as surfing boards, the holder may be provided at its free end with a thread which mates with a complementary thread of the abutment. In this manner, the abutment can be threaded onto the free end of the holder and the effective length of the holder can be adjusted by turning the abutment to a greater or lesser extent. In order to avoid the possibility that the abutment could be disengaged from the holder by loosening the same, the abutment is provided with a projection which extends into the through opening of the object, such as the sailing craft, at a distance from the main portion of the holder which exceeds the width of the opening. The abutment is threaded onto the free end of the holder and turned until the desired effective length is achieved, before the holder is introduced into the opening. Then, the holder is introduced into the opening and engaged with the one element by means of the sliding member during this introduction. The projection of the abutment is also introduced into the opening of the object wherein it prevents undesired turning of the abutment on the holder.

The holder may have an elongated main portion, and an engaging portion which is also elongated and extends transversely of the main portion at its engaging end. It is particularly advantageous when the length of the engaging portion exceeds the width of the interior of the tubular element as considered in a plane transverse to the opening of the one element, so that the engagement of the engaging portion with a lateral wall of the hollow tubular element prevents a turning of the holder about the axis of the main portion thereof. However, when two holders both connected to or threaded into a common abutment are used and when both of them pass through the opening of the object, it is no longer necessary to provide any means for securing the abutment against turning relative to the holders inasmuch as the holders themselves, by being accommodated in the opening of the object at a distance from one another, prevent turning of the abutment relative thereto. The holders themselves, because of the length of the engaging portion received in the hollow tubular member, cannot be rotated there relative to the abutment when they are introduced into the respective openings and apertures of the tubular element, on the one hand and the sliding member, on the other hand, in the engaging position of the sliding member so that they cannot be unthreaded from the abutment. Consequently, an adjustment of the effective length of the holders can only be achieved when the holders are not yet introduced into the interior of the hollow tubular element.

The novel features which are considered as characteristic of the invention are set forth in particular in the appended claims. The improved carrier itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary longitudinal sectional view of the longitudinal element of FIG. 2 in the withdrawn position of a sliding member;

FIG. 4 is a view corresponding to that of FIG. 3 but showing the sliding member in the engaging position; and FIG. 5 illustrates a portion of a modified holder.

DESCRIPTION OF THE PREFERRED EMBODIMENTS

Figure 1:
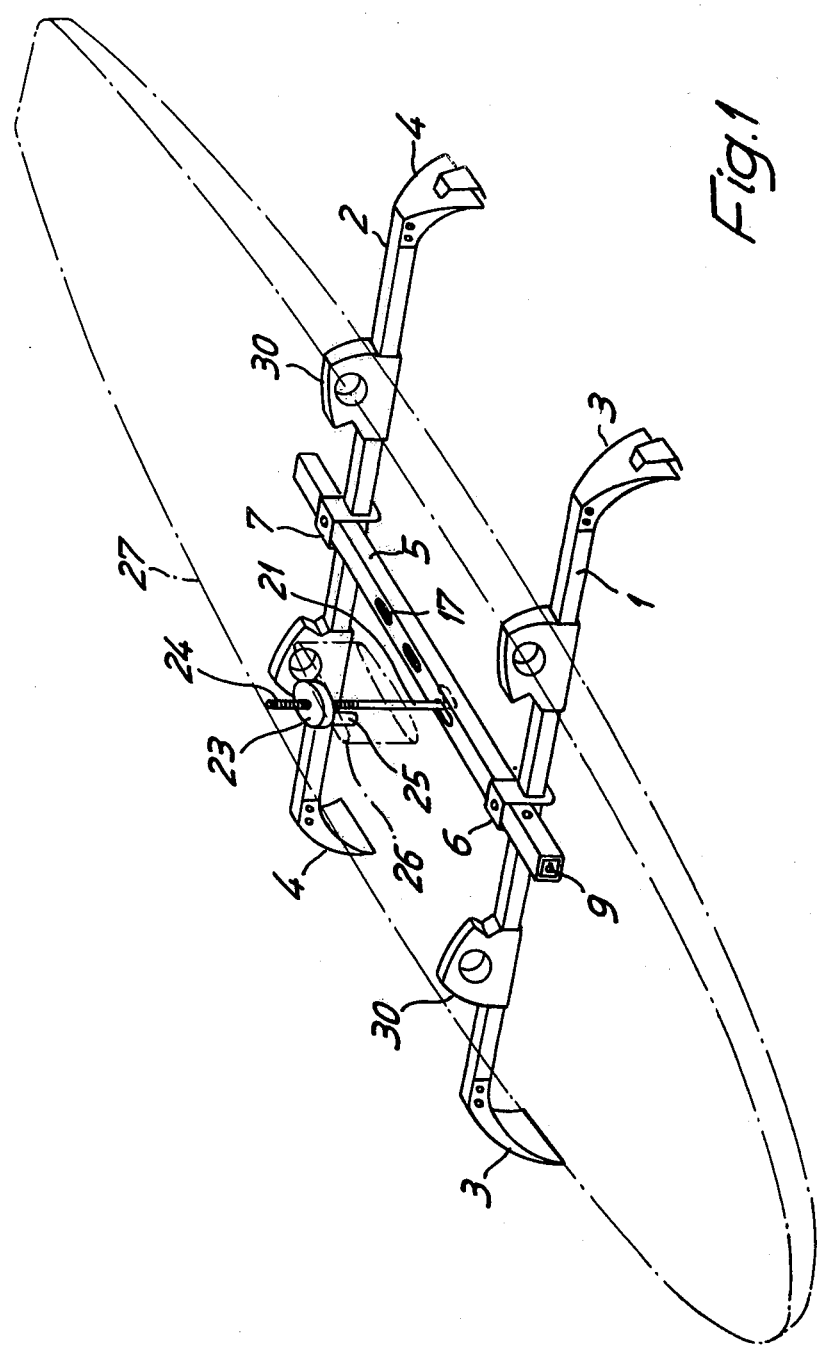
FIG. 1 is a perspective view of a roof carrier according to the invention.

Referring first to FIG. 1, the roof carrier in which the present invention is embodied includes two transverse elements 1 and 2 extending transversely of the motor vehicle in the assembled condition of the carrier. The transverse elements 1 and 2 are respectively connected to the motor vehicle by connectors 3 and 4 which engage behind a projecting portion of the motor vehicle in a conventional and hence not illustrated manner. The two transverse elements 1 and 2 are connected to one another by a tubular longitudinal element 5. The longitudinal element 5 is connected to the transverse elements 1 and 2 by means of U-shaped brackets 6 and 7.

Figure 2:
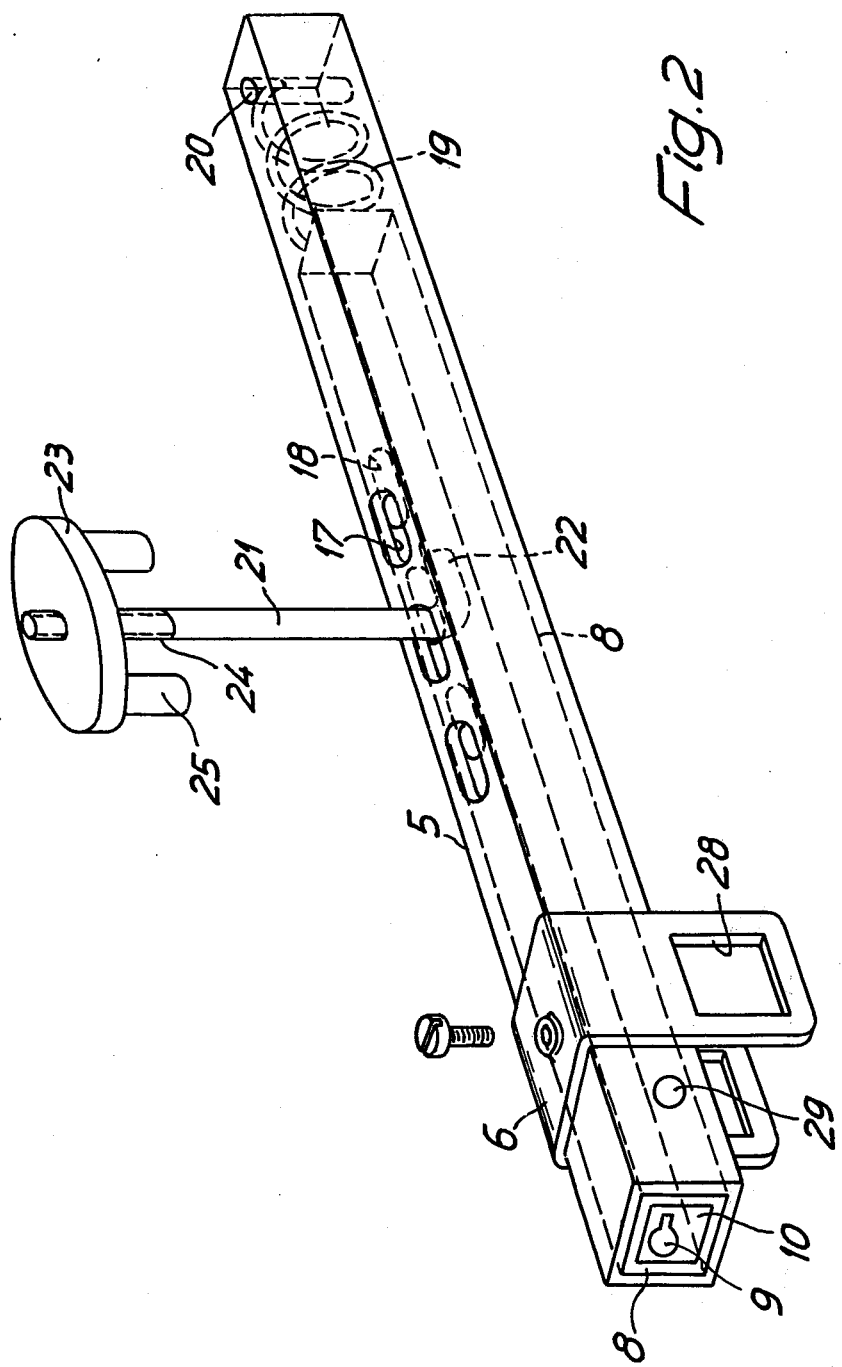
FIG. 2 is a larger-scale perspective view of a longitudinal element of the support structure shown in FIG. 1.

As illustrated particularly in FIG. 2, the tubular longitudinal element 5 has a square configuration and receives and guides a sliding member 8 which also has a tubular configuration and the outer contour of which substantially conforms to the inner contour of the longitudinal element 5. At one of its ends which, when the roof carrier is assembled with the motor vehicle, faces forwardly, the sliding member 8 is provided with a lock 9 which is conventional as to its internal construction and is received in an intermediate member 10. Advantageously, the lock 9 is a cylinder lock which, as seen in FIGS. 3 and 4, has a stationary part 12 provided with a fin 11, and a part 13 which can be rotated by a key and has a fin 14. The intermediate member 10 is provided with a longitudinal slot 15 into which there extends a pin 16 which is rigid with the longitudinal element 5. In this manner, the shifting of the sliding member 8 is limited to the longitudinal direction of the slot 15. The pin 16 additionally serves as a stop for the fin 14 when the rotatable part 13 equipped with the fin 14 is rotated by the key to assume the locking position illustrated in FIG. 4. In this position, the fin 14 engages behind the pin 16 so that the sliding member 8 can no longer be extracted from the longitudinal element 5.

The longitudinal element 5 and the sliding member 8 are respectively provided with elongated apertures 17 and 18 which, in the withdrawn position in which the sliding member 8 extends to a certain extent outwardly of the longitudinal element 5, are in registry with one another. The sliding member 8 is urged toward this position by a spring 19 which, at one of its ends, presses against a pin 20 (see FIG. 2) which is connected to the longitudinal element 5 and, on its other end, acts on the end of the sliding member 8 which faces away from the lock 9.

In the example which is illustrated in FIG. 2, a holder 21 is introduced into one pair of the registering apertures 17 and 18. At its end which is introduced into the apertures 17 and 18, the holder 21 is formed with an engaging portion 22 extending transversely of the longitudinal direction of the generally rod-shaped holder 21. At the free end thereof which is spaced from the element 5 in the assembled position, the holder 21 is equipped with an abutment 23 which meshes with a thread 24 of the holder 21 and thus can be adjusted as to its position relative to the holder 21. In this manner, the effective length of the holder 21 can be adjusted.

The illustrated holder 21 is designed for holding a sailing craft, such as a surfing board, having an elongated central opening therein. For this use, the underside of the abutment 23 is provided with securing pins 25 which, in the secured position of the holder 21, extend into a through opening 26 of a surfing board 27 which is illustrated in FIG. 1 by phantom lines. The abutment 23 has a width exceeding that of the through opening 26, and the securing pins 25 are offset from the holder 21 by a distance exceeding one-half the width of the through opening 26. Thus, the abutment 23 cannot be unthreaded from the holder 21 when the latter is secured to the longitudinal element 5 by the sliding member 8. The mode of introduction and securing of the holder 21 to the element 5 can be best seen in FIGS. 3 and 4. In FIG. 3, the sliding member 8 is in its withdrawn position and the apertures 17 and 18 are in register with one another. After the introduction of the transverse engaging portion 22 through the apertures 17 and 18 and into the interior of the hollow sliding member 8, the latter is displaced to the engaging position of FIG. 4, so that two openings 17 and 18 are displaced relative to one another to such an extent that they finally leave a common cross section of only such size that the main portion of the holder 21 is snugly received therein. the cross section which remains free after the relative shifing of the openings 17 and 18 is substantially smaller than the transverse dimension of the hook-shaped engaging portion 22, so that the holder 21 can no longer be extracted from the apertures 17 and 18 in the upward direction. In order to enhance the security of attachment of the object to be transported to the support structure, a plurality of holders 21 of the above-discussed type can be used instead of a single one. For this reason, the longitudinal element 5 and the sliding member 8 are each provided with a plurality of apertures 17 and 18. Under these circumstances, individual abutments 23 can be provided for each of the holders 21, or a common abutment can be used into which the individual holders 21 can be threaded. Then, this common holder need no longer be provided with the securing pins 25, inasmuch as an unthreading of the common abutment is not possible when at least two holders 21 are threaded into it and are received in the through opening 26 of the sailing craft 27.

FIG. 5 shows a portion of a modified holder 121 having an eyelet 121a which can be introduced into the interior of the element 5 by way of the aperture 17. The eyelet 121a then receives a portion 108a of the sliding element when the latter assumes its engaging position.

The U-shaped brackets 6 and 7, which have openings 28 in their arms, are slipped onto the transverse elements 1 and 2 associated therewith and cannot be removed therefrom when the transverse elements 1 and 2 are connected to the above-mentioned projection of the motor vehicle. However, the connection to this projection by means of the support elements 3 and 4 must be such that it cannot be interrupted in an unauthorized manner. Support elements 3 and 4 of this construction are well known in the art.

In order to avoid the possibility of extraction of the longitudinal element 5 from the brackets 6 and 7, a rivet 29 is provided at least at the forward end of the longitudinal element 5, so that the longitudinal element 5 can no longer be extracted from behind. An extraction from the front is also impossible when the holder 21 is mounted on and secured to the element 5. In the illustrated embodiment, the longitudinal element 5 can be easily removed from the transverse elements 1 and 2 in the frontward direction in the absence of the holder 21 so that the roof carrier support structure, and more particularly the transverse elements 1 and 2, can be used for supporting other objects on the roof of the vehicle, in that, for instance, connecting elements for skis or for bicycles can be mounted thereon.

In the illustrated embodiment of the invention, the transverse elements 1 and 2 have support members 30 for supporting the surfing board 27 mounted thereon. These support members 30 can be mounted on the respective transverse elements 1 and 2 in an easily dismountable manner. The same applies for non-illustrated connecting or tensioning belts which may be provided for rigidly connecting the surfing board 27 to the support members 30.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A roof carrier for use on motor vehicles, comprising a supporting structure mounted at the roof of a motor vehicle when in use and including a plurality of interconnected elements including a longitudinally extending element and at least one transversely extending element; at least one holder assemblable with said supporting structure; and means for securing said holder to said supporting structure when assembled therewith, including a sliding member mounted on one of said elements for displacement between a withdrawn and an engaging position and so acting on said holder as to hold the latter in engagement with said one element only in said engaging position, and means for locking said sliding member at least in said engaging position.

2. The roof carrier as defined in claim 1 for transporting sailing craft provided with a through opening, wherein said holder is a rod and has a free end portion remote from said one element, and further comprising an abutment mounted on said free end portion of said rod and having a dimension exceeding the width of the through opening of the sailing craft.

3. The roof carrier as defined in claim 2, wherein said free end portion of said rod has a first thread and said abutment has a second thread meshing with said first thread in assembled condition of said abutment with said holder, and further comprising means for maintaining said abutment in said assembled condition against unthreading from said rod.

4. The roof carrier as defined in claim 3, wherein the through opening of the sailing craft is elongated and said maintaining means includes at least one projection provided on said abutment and extending into the elongated opening of the sailing craft laterally of said rod in said assembled condition.

5. A roof carrier for use on motor vehicles, comprising a supporting structure mounted at the roof of a motor vehicle when in use and including a plurality of interconnected elements including a longitudinally extending and at least one transversely extending element; at least one elongated holder assemblable with said supporting structure and having a main portion and an end portion extending laterally of said main portion; and means for securing said holder to said supporting structure when assembled therewith, including a sliding member mounted on one of said elements for displacement between a withdrawn and an engaging position and so acting on said holder in said engaging position thereof as to hold the holder in engagement with said one element, and means for locking said sliding member at least in said engaging position, said one element having at least one opening of a cross section sufficient for said end portion of said holder to pass therethrough and said sliding member having an aperture registering with said opening in said withdrawn position of said sliding member, the common cross-sectional area of said opening and said aperture upon displacement of said sliding member to said engaging position being sufficiently small to prevent said end portion from passing therethrough.

6. A roof carrier for use on motor vehicles, comprising a supporting structure mounted at the roof of a motor vehicle when in use and including a plurality of interconnected elements including a longitudinally extending and at least one transversely extending element; at least one elongated holder assemblable with said supporting structure and having an eyelet at one of its ends; and means for securing said holder to said supporting structure when assembled therewith, including a sliding member mounted on one of said elements for displacement between a withdrawn and an engaging position and so acting on said holder in said engaging position thereof as to hold the holder in engagement with said one element, and means for locking said sliding member at least in said engaging position, said sliding member having a portion which is received in said eyelet in said engaging position of said sliding member.

7. A roof carrier for use on motor vehicles, comprising a supporting structure mounted at the roof of a motor vehicle when in use and including a plurality of interconnected elements including a longitudinally extending and at least one tranversely extending element; at least one holder assemblable with said supporting structure; and means for securing said holder to said supporting structure when assembled therewith, including a sliding member mounted on one of said elements for displacement between a withdrawn and an engaging position and so acting on said holder in said engaging position thereof as to hold the latter in engagement with said one element, and means for locking said sliding member at least in said engaging position, said one element being of tubular configuration and defining an internal passage, said sliding element being slidably received in said passage.

8. The roof carrier as defined in claim 7, wherein said one element has an internal surface surrounding said passage and said sliding member has an external surface complementary to said internal surface.

9. A roof carrier for use on motor vehicles, comprising a supporting structure mounted at the roof of a motor vehicle when in use and including a plurality of interconnected elements including a longitudinally extending and at least one transversely extending element; at least one holder assemblable with said supporting structure; and means for securing said holder to said supporting structure when assembled therewith, including a sliding member mounted on one of said elements for displacement between a withdrawn and an engaging position and so acting on said holder in said engaging position thereof as to hold the latter in engagement with said one element, means for urging said sliding member toward said withdrawn position thereof, and means for locking said sliding member at least in said engaging position.

10. The roof carrier as defined in claim 9, wherein said urging means includes at least one spring.

11. A roof carrier for use on motor vehicles, comprising a supporting structure mounted at the roof of a motor vehicle when in use and including a plurality of interconnected elements including a longitudinally extending and at least one transversely extending element; at least one holder assemblable with said supporting structure; and means for securing said holder to said supporting structure when assembled therewith, including a sliding member mounted on said longitudinally extending element for displacement between a withdrawn and an engaging position and so acting on said holder in said engaging position thereof as to hold the latter in engagement with said one element, and means for locking said sliding member at least in said engaging position, said locking means including a lock at the front end of said longitudinally extending element, as considered in the longitudinal direction of the motor vehicle.

12. A roof carrier for use on motor vehicles, comprising a supporting structure mounted at the roof of a motor vehicle when in use and including a plurality of interconnected elements including a longitudinally extending and at least one transversely extending element; at least one holder assemblable with said supporting structure; and means for securing said holder to said supporting structure when assembled therewith, including a sliding member mounted on one of said elements for displacement between a withdrawn and an engaging position and so acting on said holder in said engaging position thereof as to hold the latter in engagement with said one element, and means for locking said sliding member at least in said engaging position, said locking means including a lock mounted in said sliding member and accessible from a surface of the sliding member which is exposed in said engaging position thereof.

13. A roof carrier for use on motor vehicles, comprising a supporting structure mounted at the roof of a motor vehicle when in use and including a plurality of interconnected elements including a longitudinally extending and at least one transversely extending element; at least one holder assemblable with said supporting structure; and means for securing said holder to said supporting structure when assembled therewith, including a sliding member mounted on one of said elements for displacement between a withdrawn and an engaging position and so acting on said holder in said engaging position thereof as to hold the latter in engagement with said one element, and means for locking said sliding member at least in said engaging position, said holder having an elongated main portion and an end portion extending transversely of the longitudinal direction of said main portion, said one element being hollow and having at least one opening through which said end portion is introducible into the interior of said one element to engage the latter next to said opening.

14. The roof carrier as defined in claim 13, wherein the interior of said one element has a predetermined width as considered transversely of said opening, said end portion of said holder having a length exceeding said width to prevent turning of said holder about the axis of said main portion thereof.

* * * * *